(12) United States Patent
Rowland

(10) Patent No.: US 8,136,782 B2
(45) Date of Patent: Mar. 20, 2012

(54) SYSTEMS AND METHODS FOR ELEVATING AN EQUIPMENT UNIT

(76) Inventor: Jay F. Rowland, Johns Creek, GA (US)

( * ) Notice: Subject to any disclaimer, the term of this patent is extended or adjusted under 35 U.S.C. 154(b) by 235 days.

(21) Appl. No.: 12/474,575

(22) Filed: May 29, 2009

(65) Prior Publication Data

US 2009/0302185 A1 Dec. 10, 2009

Related U.S. Application Data

(60) Provisional application No. 61/059,857, filed on Jun. 9, 2008.

(51) Int. Cl.
*A47B 91/00* (2006.01)
(52) U.S. Cl. ........... 248/346.2; 248/346.01; 248/678; 248/679; 248/910
(58) Field of Classification Search ............ 248/910, 248/679, 678, 346.01, 346.2
See application file for complete search history.

(56) References Cited

U.S. PATENT DOCUMENTS

| | | | | |
|---|---|---|---|---|
| 3,334,850 A * | 8/1967 | Jackson et al. | ............ | 248/679 |
| 3,722,845 A * | 3/1973 | Unger | ............ | 248/346.03 |
| 4,505,449 A * | 3/1985 | Turner et al. | ............ | 248/669 |
| 5,197,707 A * | 3/1993 | Kohan | ............ | 248/638 |
| 5,277,395 A * | 1/1994 | Smith et al. | ............ | 248/679 |
| 5,356,108 A * | 10/1994 | Stagl et al. | ............ | 248/346.01 |
| 5,950,980 A * | 9/1999 | Folmar | ............ | 248/678 |
| 6,050,539 A * | 4/2000 | Millen | ............ | 248/678 |
| 6,405,992 B1 * | 6/2002 | Palmer | ............ | 248/679 |
| 6,518,499 B1 * | 2/2003 | Kessler | ............ | 174/50 |
| 6,889,953 B2 * | 5/2005 | Harbaugh | ............ | 248/519 |
| 7,197,569 B2 * | 3/2007 | Dowling | ............ | 709/230 |
| 7,334,421 B1 | 2/2008 | Cantolino | | |

* cited by examiner

*Primary Examiner* — Amy J Sterling
(74) *Attorney, Agent, or Firm* — Eric W. Cernger

(57) ABSTRACT

A system may support an equipment unit above a ground surface. The system generally includes a support and a cavity. The support may elevate the equipment unit off of the ground surface. The cavity may be adapted for receiving a fill material to maintain the fillable pad on the ground surface.

20 Claims, 5 Drawing Sheets

SYSTEMS AND METHODS FOR ELEVATING AN EQUIPMENT UNIT

CROSS-REFERENCE TO RELATED APPLICATIONS

This application claims the benefit of U.S. Provisional Application Ser. No. 61/059,857 entitled "Systems and Methods for Elevating an Equipment Unit," filed Jun. 9, 2008, which is incorporated herein by reference in its entirety.

TECHNICAL FIELD

The present disclosure generally relates to systems and methods for elevating an equipment unit, and more particularly relates to a fillable pad for elevating an equipment unit, and associated methods for elevating an equipment unit using a fillable pad.

BACKGROUND

Equipment units such as air conditioning condenser units and heat pumps are commonly used to heat and cool homes and small commercial buildings. Typically, these and other equipment units may be installed about an exterior of a home or a building adjacent to the ground. So that the equipment unit is above ground level, out of the way of water and landscaping, the equipment unit may be installed on an equipment pad.

Some equipment pads are created directly onsite using concrete. The concrete is mixed, poured, and left to cure before the equipment unit is installed. Thus, installing the equipment unit on a poured concrete pad may require multiple trips to the job site over several days, which may be undesirable. To reduce the delay, the concrete pad may be pre-fabricated offsite and shipped to the location where needed. However, the weight of the concrete pad may make shipping the pad prohibitively expensive and may also increase the labor costs associated with installation.

For these and other reasons, lightweight equipment pads have been developed as alternatives to concrete pads. Lightweight pads include plastic pads and concrete-covered foam pads. When a lightweight pad is used, the pad may be anchored to the ground using a separate anchoring system. The anchoring system prevents the pad from shifting, but increases the cost of installation.

The use of lightweight pads may be prohibited by law in some areas. For example, unanchored lightweight pads cannot be used in some areas of south Florida, where hurricane force winds are expected. In this and other instances, a concrete pad may be used, necessitating the delay associated with fabricating the pad directly onsite or the cost associated with pre-fabricating the pad offsite.

From the above, it is apparent that a need exists for systems and methods of elevating an equipment unit off of the ground. The systems and methods described below address the aforementioned deficiencies and inadequacies.

SUMMARY

A system may support an equipment unit above a ground surface. The system generally includes a support and a cavity. The support may elevate the equipment unit off of the ground surface. The cavity may be adapted for receiving a fill material to maintain the fillable pad on the ground surface.

Also provided is a method of elevating an equipment unit above a ground surface. The method comprises placing a fillable pour-in-place pad configured to support the equipment unit on the ground surface. The fillable pad has a support surface for the equipment pad formed as a substantially planar circumambient terrace with respect to an open cavity that is provided for receiving workable fill material. The circumambient support surface terrace has an interior boundary defining a large, centrally located top opening of the cavity and an exterior boundary defining an intersection between the support surface and one or more exterior walls. The interior boundary of the support surface has a span that at least approaches, in extent, a corresponding span of a corresponding bottom perimeter of the equipment unit. For example, in one embodiment, the interior boundary of the support surface has a configuration and extent that approaches, but is interiorly located with respect to, the corresponding bottom corners of the equipment unit for which the fillable pad is provided for support. The method further comprises placing a workable cementitious fill material in the cavity of the fillable pad; placing the equipment unit on the support surface of the fillable pad; and allowing the workable fill material to solidify and cure.

Other systems, devices, methods, features, and advantages of the disclosed systems and methods for elevating an equipment pad will be apparent or will become apparent to one with skill in the art upon examination of the following figures and detailed description. All such additional systems, devices, methods, features, and advantages are intended to be included within the description and are intended to be protected by the accompanying claims.

BRIEF DESCRIPTION OF THE FIGURES

The present disclosure may be better understood with reference to the following figures. Corresponding reference numerals designate corresponding parts throughout the figures, and components in the figures are not necessarily to scale.

DETAILED DESCRIPTION

Described below are embodiments of systems and methods for elevating an equipment unit. Such systems and methods may include a fillable pad. The fillable pad generally includes a support for elevating an equipment unit, such as an air conditioning unit, off of a lower surface, such as the ground. The fillable pad also includes at least one cavity for receiving a fill material, such as a cement material. In use, the support is placed on the ground, the fill material is placed in the cavity, and the equipment unit is placed on the support. Thereby, the equipment unit may become elevated above the ground on the fillable pad, and the fill material in the cavity may maintain the fillable pad on the ground.

The fill material may be any material that facilitates maintaining the fillable pad on the ground. For example, the fill material may have a weight that is sufficient to maintain the fillable pad in contact with the ground.

In embodiments, the fillable pad embodies a leave-in-place form for a workable material that may solidify to maintain the fillable pad on the ground. The workable material may be placed in the fillable pad in a workable state, and may subsequently set, cure, or otherwise solidify. The fillable pad may be configured so that an equipment unit may be placed on the fillable pad before the workable material solidifies. For example, the fillable pad may be shaped and dimensioned so that when the equipment unit is placed on the fillable pad, the equipment unit is out of contact with any workable material therein.

In such embodiments, the fill material may be any material that progresses from a workable state to a solidified state with the passage of time. Such materials may be placed in the fillable pad in a workable state and may subsequently solidify. Examples include cementitious materials such as concrete, or other cement-like materials. Such materials may be mixed directly in the fillable pad or may be poured into the fillable pad after being mixed elsewhere. However, the fill material may be any other suitable material that may be placed in the fillable pad to maintain the fillable pad on the ground. For example, the fill material may be a material that is workable even when solidified, such rocks, pebbles, or other particulate. In fact, any material of sufficient weight, mass, or density may be employed.

Figure 1:
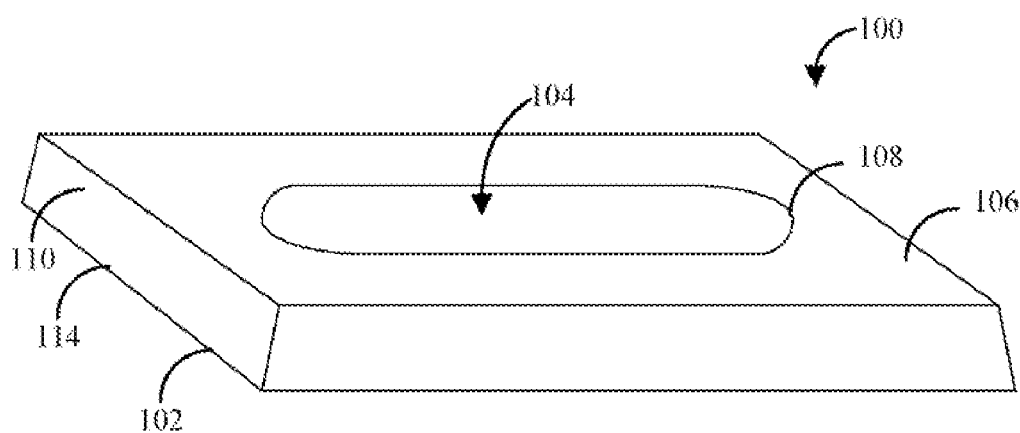
FIG. 1 is a perspective view of an embodiment of a fillable pad.
Figure 2:
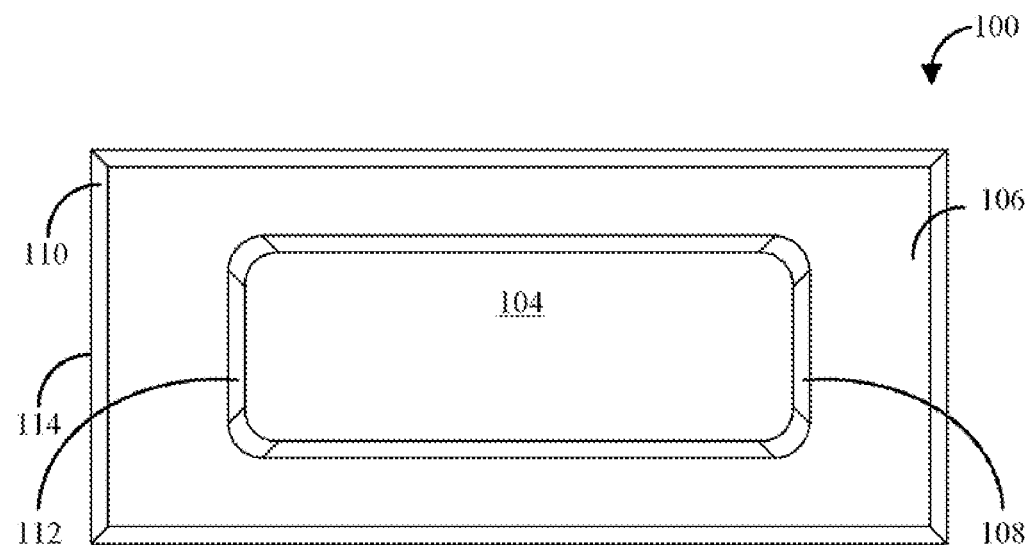
FIG. 2 is a top plan view of the embodiment of the fillable pad shown in FIG. 1.

FIG. 1 is a perspective view of an embodiment of a fillable pad 100, and FIG. 2 is a top plan view of the fillable pad 100. As mentioned above, the fillable pad 100 generally includes a support 102 and an open cavity 104 or basin for receiving workable fill material. The support 102 includes a support surface 106 that is elevated above the ground. The support surface 106 is relatively level so that the equipment unit may be relatively level when supported thereon. The support surface is also formed as a substantially planar circumambient terrace with respect to the cavity 104. An interior boundary of the circumambient terrace support surface defines the top opening 108 of the cavity 104, so that a fill material may be placed in the cavity 104. The cavity 104 is centrally located in an interior of the support 102.

The opening 108 may be sized, shaped, and positioned within the support surface 106 to permit maintaining an equipment unit on the support surface 106 out of contact with any fill material in the cavity 104. For example, the opening 108 may be relatively smaller in dimension than the equipment unit. The opening 108 also may be relatively different in shape than the equipment unit, so that portions of the equipment unit intended to contact the support surface 106 do not come in contact with the opening 108. Other embodiments may include any combination of these and other configurations that facilitate holding the equipment unit out of contact with the fill material. In embodiments, the opening 108 may be shaped and positioned to permit at least partially viewing any fill material in the cavity 104, which may facilitate ensuring upon visual inspection that the fillable pad 100 is properly filled.

The support 102 may include an exterior wall 110 and an interior wall 112. The exterior and interior walls 110, 112 may elevate the support surface 106 off of the ground. As shown in the illustrated embodiment, the support surface 106 may have an exterior boundary or outer periphery that joins to the exterior wall 110 and an interior boundary or inner periphery that joins to the interior wall 112. The intersection of the support surface 106 and the interior wall 112 defines the interior boundary of the support surface 106, and likewise the boundary of the opening 108.

The support 102 may be relatively hollow, relatively solid, or some combination thereof. In embodiments in which the support 102 is relatively hollow, the support surface 106 may extend between the exterior and interior walls 110, 112, but the exterior and interior walls 110, 112 may otherwise be separated by a relatively empty space. In such embodiments, the fillable pad 100 may be configured for nesting with other similarly shaped fillable pads. Nesting the fillable pads 100 may decrease the cost of shipping a number of fillable pads 100, such as from a point of manufacture to a point of sale.

In embodiments in which the support 102 is relatively solid, the support 102 may be a unitary body formed by a process such as molding. In such embodiments, the exterior and interior walls 110, 112 may not be separate walls, but instead may be exterior and interior surfaces of the unitary body. The support 102 also may have a filler substance such as foam placed between the exterior and interior walls 110, 112. In such embodiments, the material located between the exterior and interior walls 110, 112 may further support the support surface 106 and may facilitate transferring the weight of the equipment unit to the ground. In still other embodiments, the support 102 may be partially hollow between the exterior and interior walls 110, 112. For example, ribbing or other support structures may be provided between the walls 110, 112.

In embodiments, the interior wall 112 may define the cavity 104 for receiving the fill material. The interior wall 112 may be relatively continuous and spaced inward from the exterior wall 110 such that the interior wall 112 defines the boundary of the cavity 104. In other embodiments, the interior wall 112 may not define the boundary of the cavity 104. The interior wall 112 may include one or more passages or openings that permit fill material to travel into the space defined between the exterior and interior walls 110, 112 and below the support surface 106. In such embodiments, the cavity 104 may extend past the interior wall so that additional fill material may be used. The fill material may intermingle with any ribbing or support structures between the exterior and interior walls 110, 112 to further hold the fillable pad 100 down.

The support 102 also may be relatively lightweight, which may decrease both shipping and installation costs. For example, the support 102 may be made from a plastic material, such as high-density polyethylene (HDPE). It should be noted, however, that the support 102 may be formed from any material capable of supporting the weight of the equipment unit and transferring the weight of the equipment unit to the ground. Examples of other suitable materials include thermoset polymer or resin materials, thermoplastic polymer or resin materials, polymer composite materials, crumb rubber composite materials, fiberglass materials, fiber-cement materials, other materials, and combinations thereof.

Figure 3:
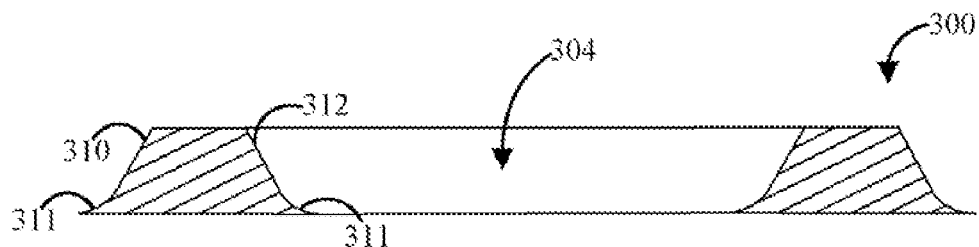
FIG. 3 is a side cross-sectional view of another embodiment of a fillable pad.

The fillable pad may be configured to contain the fill material within the cavity. An example is shown in FIG. 3, which is a cross-sectional side view of an embodiment of a fillable pad 300. As shown, the fillable pad 300 includes an interior wall 312 that is configured to extend all the way to the ground. Specifically, the interior wall 312 may have a vertical dimension that is about the same as a vertical dimension of the exterior wall 310, so that fill material may be contained within the cavity 304 instead of seeping between the exterior and interior walls 310, 312. In embodiments, the fill material may be further contained within the cavity 304 by a lower surface that encloses the cavity 304 on a lower side. The lower surface may join to the interior wall 312 about, for example, a lower edge of the interior wall 312.

The fill material may anchor the fillable pad 300 to the ground. To facilitate the anchoring, the interior wall 312 may be angled, such that the cavity 304 has a relatively larger cross-sectional area on an upper portion than on a lower portion. Thus, upward and lateral movement of the fillable pad 300 may be impeded once the cement or other fill material becomes solidified within the cavity 304. Although the interior wall 312 is shown having a flat angled surface, it is understood that the interior wall 312 may be other shapes, such as curved or V-shaped. Alternatively, the interior wall 312 may be vertical or inwardly angled, such that lateral movement of the fillable pad 300 is impeded.

In embodiments, a lip 311 may be provided on a lower edge of the exterior wall 310, the interior wall 312, or both. The lip 311 may be a flanged extension of the wall along the lower edge, which increases the portion of the wall in contact with the ground. Alternatively, the lip 311 may be a separate flanged portion positioned about the lower edge of the wall. The lip 311 may facilitate transferring the weight of the equipment unit to the ground. The lip 311 may be either relatively continuous or intermittently spaced along the lower edge.

Figure 4:
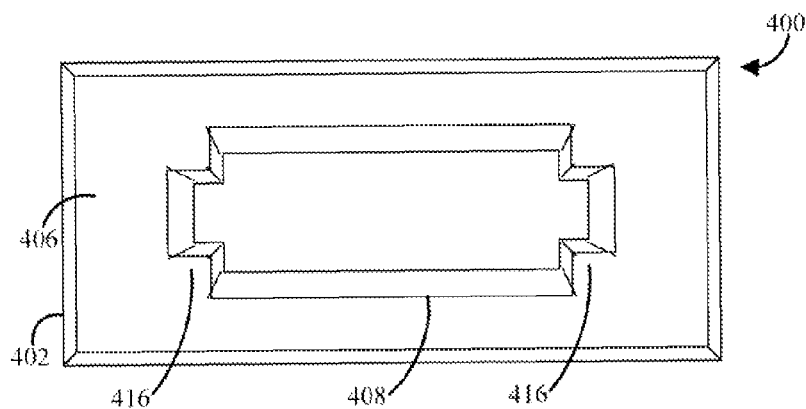
FIG. 4 is a top plan view of another embodiment of a fillable pad.

The support may be sized and shaped according to the configuration of the equipment unit. For example, the opening may be sized, shaped and positioned so as to maintain the equipment unit out of contact with the fill material in the cavity. Thus, in cases in which the fill material is concrete or any other cement material, the equipment unit may be placed on the support before the concrete has cured. An example is shown in FIG. 4, which is a top plan view of an embodiment of a fillable pad 400 having support projections 416. The support projections 416 may be extensions of the support surface 406 that extend into the opening 408. In the illustrated embodiments, the support projections 416 are located at corners of a rectangle. Thus, the opening 408 is sized and shaped for use with an equipment unit having four feet positioned at corners of a rectangle. When the equipment unit is placed on the support 402, the equipment unit may contact the support surface 406 along the support projections 416. Other configurations are possible, depending on the equipment unit.

Figure 5:
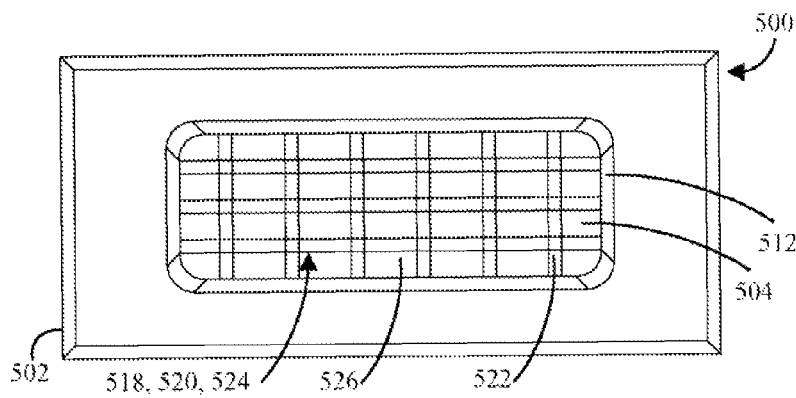
FIG. 5 is a top plan view of an embodiment of a fillable pad having a weight transfer structure.

FIG. 5 is a top plan of an embodiment of a fillable pad 500 that includes a weight transfer structure 518. The weight transfer structure 518 may be adjacent to a lower edge of the support 502 and may increase the surface area of the fillable pad 500 that contacts the ground. Thus, the weight of the equipment unit may be further transferred to the ground through the weight transfer structure 518.

The weight transfer structure 518 may have a variety of shapes, sizes, and dimensions. For example, the weight transfer structure 518 may be a lattice structure 520 formed from a number of ribs 522. The ribs 522 may extend across the lower side of the cavity 504 and may couple to the lower edge of the interior wall 512. In other embodiments, the weight transfer structure 518 may have other configurations. For example, the weight transfer structure 518 may be a relatively continuous sheet extending across the lower side of the cavity 504 adjacent to the ground.

Figure 6:
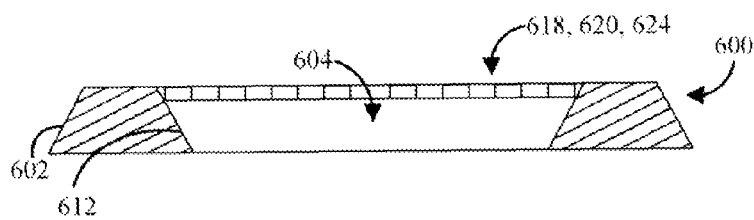
FIG. 6 is a side cross-sectional view of another embodiment of a fillable pad having a weight transfer structure.

FIG. 6 is a side cross-sectional view of another embodiment of a fillable pad 600 that includes a weight transfer structure 618. The weight transfer structure 618 may be adjacent to an upper edge of the support 602 and may increase the surface area of the fillable pad 600 that contacts the equipment unit. Thus, the weight of the equipment unit may be further transferred to the fillable pad 600 through the weight transfer structure 618. As shown, the weight transfer structure 618 may be a lattice structure 620 formed from a number of ribs 622, although other configurations are possible.

The fillable pad may be anchored to the ground using an anchoring system. In the embodiments shown in FIGS. 5 and 6, the lattice structures 520, 620 further serve as anchoring systems 524, 624. With reference to FIG. 5, the lattice structure 520 may include a number of interstices 526 formed between the ribs 522. When the till material is placed in the cavity 504, the till material may become embedded among the interstices 526 in the lattice structure 520, further anchoring the support 502 to the fill material, and thus the ground. However, the anchoring system 524 may have other configurations. For example, an external anchoring system may be used, such as the anchor described below with reference to FIG. 15.

Figure 7:
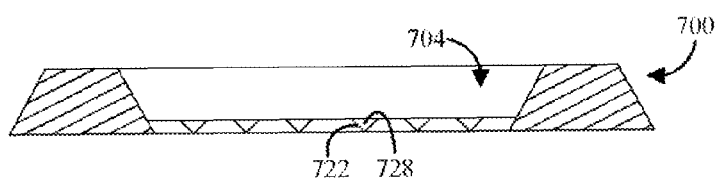
FIG. 7 is a side cross-sectional view of an embodiment of a fillable pad, illustrating an embodiment of a lattice structure.
Figure 8:
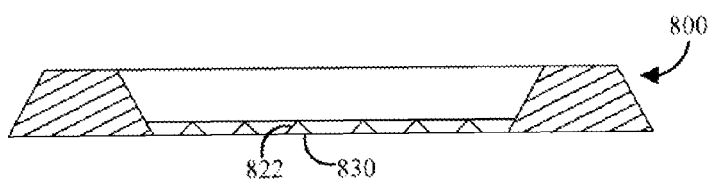
FIG. 8 is a side cross-sectional view of another embodiment of a fillable pad, illustrating another embodiment of a lattice structure.

FIGS. 7-8 are side cross-sectional views of fillable pads 700 and 800, respectively, illustrating a variety of configurations for the ribs of the lattice structure. As shown in FIG. 7, the ribs 722 may be shaped to direct fill material toward an underside of the ribs 722. For example, the ribs 722 may have a V-shape or any other inwardly extending shape. When the fill material is placed in the cavity 704, the fill material may be directed under the ribs 722 such that the ribs 722 become captured within the fill material. Thus, the fillable pad 700 may be more firmly anchored to the ground. In some cases, the ribs 722 may have a relatively hollow and exposed interior 728, so that the fill material may become embedded within the relatively hollow interior of the ribs 722, further capturing the ribs 722 and anchoring the fillable pad 700 to the ground. However, in other embodiments the ribs 722 may be relatively solid or relatively hollow but enclosed.

As shown in FIG. 8, the ribs 822 may be shaped to increase the surface area in contact with the ground. For example, the ribs 822 may have an inverted V-shape or any other outwardly extending shape. When the fillable pad 800 is placed on the ground, lower surfaces 830 of the ribs 822 may contact the ground to further support the weight of the equipment unit. In some embodiments, the lower surfaces 830 may be omitted and the ribs 822 may be hollow, so that the fillable pad 800 is adapted for nesting with other similarly shaped fillable pads. Embodiments of the fillable pad 700 shown in FIG. 7 also may be configured for nesting.

Figure 9:
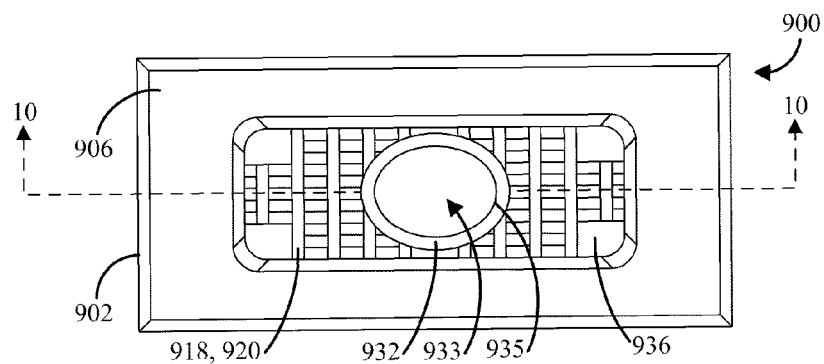
FIG. 9 is a top plan view of another embodiment of a fillable pad, illustrating a support pillar.
Figure 10:
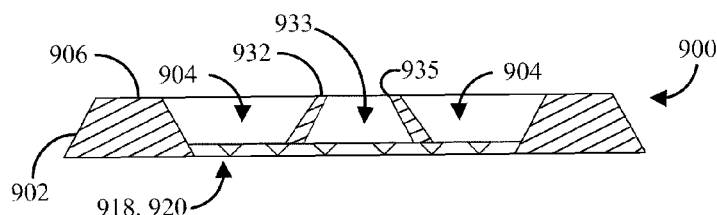
FIG. 10 is a side cross-sectional view of the embodiment of the fillable pad shown in FIG. 9.

FIGS. 9 and 10 are top plan and side cross-sectional views of a fillable pad 900 that includes a support pillar 932. The support pillar 932 may be adapted to transfer at least a portion of the weight of the equipment unit to the ground. Specifically, the support pillar 932 may have an upper side that is relatively co-planar with the support surface 906, and a lower side that is relatively co-planar with a lower side of the support 902, such that the support pillar 932 extends through the fillable pad 900 to contact the ground. Thus, when the equipment unit is placed on the support surface 906, a portion of the equipment unit may contact the support pillar 932, and a portion of the weight of the equipment unit may be transferred through the support pillar 932 to the ground.

The support pillar 932 may have a relatively hollow interior that defines an additional cavity 933. The additional cavity 933 may be accessible through an additional opening 935 on an upper side of the support pillar 932. Thus, fill material may be placed in the additional cavity 933 through the additional opening 935 to further anchor the fillable pad 900 to the ground. However, the support pillar 932 may have other configurations. For example, the support pillar 932 may be relatively solid or hollow but enclosed.

As shown, the support pillar 932 may be centrally located and symmetrically shaped, facilitating relatively even weight dispersion. However, the support pillar 932 may have a range of other shapes and configurations, such as square or off-center. Further, a number of such support pillars may be provided in some embodiments. Also, the support pillar 932 is shown extending upward from a lattice structure 920 for illustrative purposes only. In other embodiments, the lattice structure 920 may have any other configuration, or the support pillar 932 may extend upward from a ground portion 918 having any other shape.

FIG. 9 also illustrates a number of access openings 936 in the ground portion 918. The access opening 936 may permit an anchor to be inserted through the ground portion 918 into the ground, as further described below. The access openings 936 also may permit a post hole digger to be inserted through the ground portion 918 for forming a hole in the ground. The hole may be suited for receiving an anchor. For example, the anchor may be a post inserted into the hole, which may extend through the cavity into the hole. As another example, the anchor may be concrete that descends through the ground portion 918 into the hole when in workable form and subsequently solidifies to further anchor the fillable pad 900 to the ground.

Figure 11:
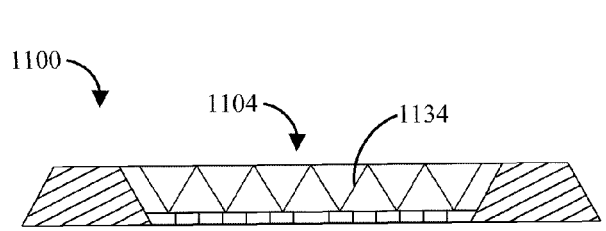
FIG. 11 is a side plan view of an embodiment of a reinforcement positioned in a cavity of a fillable pad.
Figure 12:
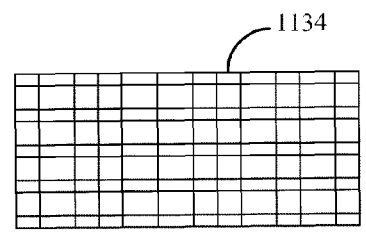
FIG. 12 is a top plan view of the reinforcement shown in FIG. 11.
Figure 13:
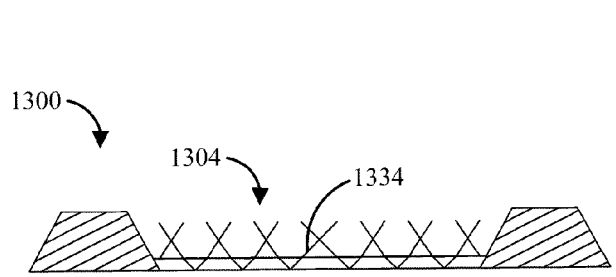
FIG. 13 is a side plan view of another embodiment of a reinforcement positioned in a cavity of a fillable pad.
Figure 14:
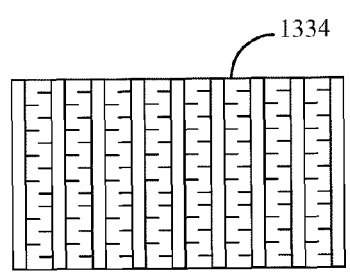
FIG. 14 is a top plan view of the reinforcement shown in FIG. 13.

FIG. 11 is a side plan view of a reinforcement 1134 in a cavity 1104 of a fillable pad 1100, and FIG. 12 is a top plan view of the reinforcement 1134. The reinforcement 1134 may strengthen the fill material, such as concrete. For example, the reinforcement 1134 may be a metal rebar grid positioned in the cavity 1104. As another example, the reinforcement 1134 may be integrally formed with the support of the fillable pad 1100, such as by molding. FIG. 13 is a side plan view of an embodiment of a reinforcement 1334 in a cavity 1304 of a fillable pad 1300, and FIG. 14 is a top plan view of the reinforcement 1334. As shown, the reinforcement may have upwardly projecting prongs that further reinforce the fill material, such as concrete. The upwardly projecting prongs may be integrally molded with the fillable pad 1300, although other configurations are possible.

Figure 15:
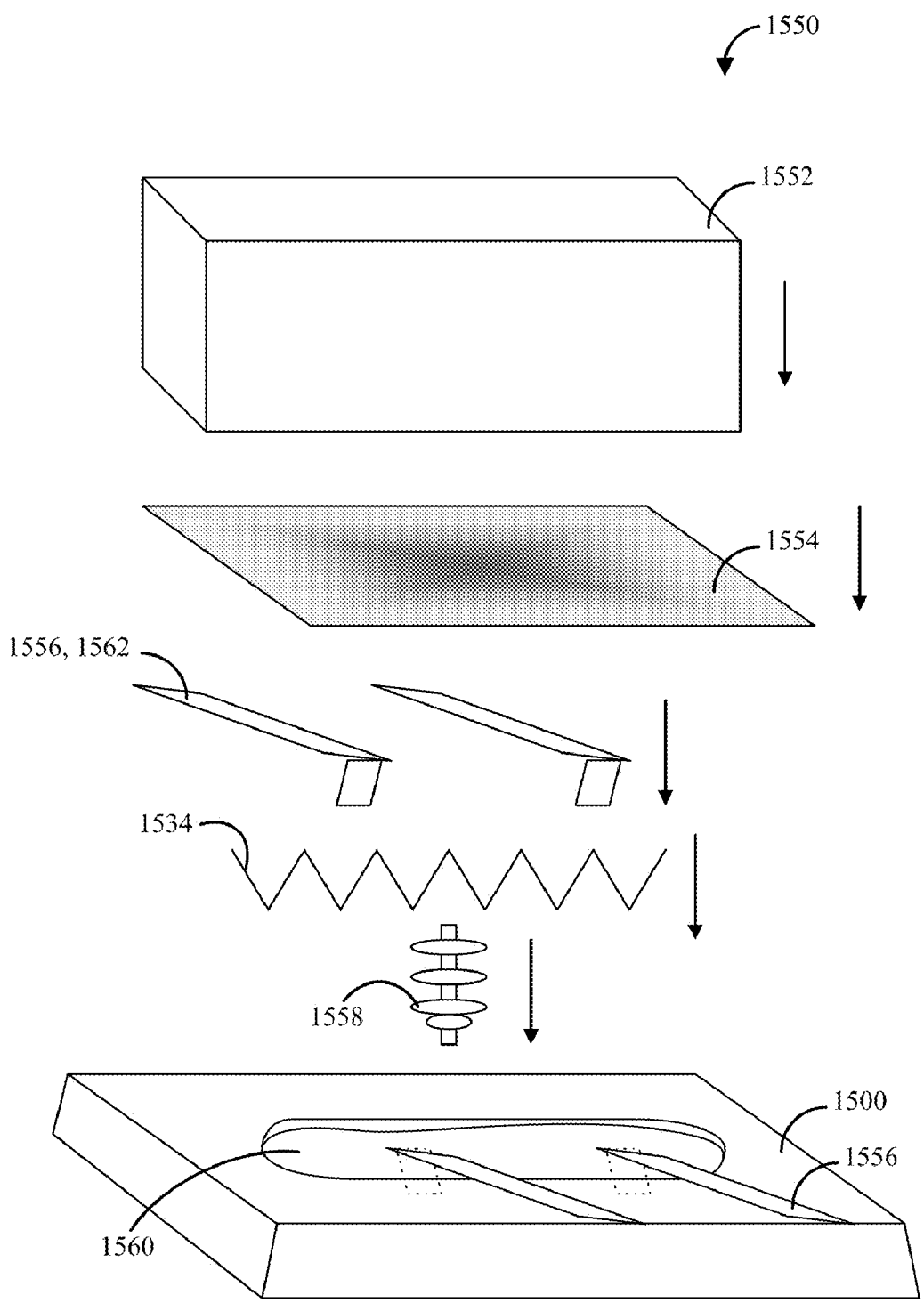
FIG. 15 is a perspective view of an embodiment of a system for elevating an equipment unit, the system including a fillable pad and other associated components.

FIG. 15 is a perspective view of an embodiment of a system 1550 for elevating an equipment unit, the system including a fillable pad 1500 and other associated components. For example, the system 1550 may include any combination of the following: an equipment unit 1552, a sheet 1554, an anchoring system 1556 for anchoring the equipment unit 1552 to the fillable pad 1500, an anchoring system 1558 for anchoring the fillable pad 1500 to the ground, a reinforcement 1534, and a fill material 1560. In the illustrated embodiment, the anchoring system 1556 includes a number of straps 1562, generally described below, but any other suitable anchoring system 1556 may be employed. For example, the anchoring system 1556 may be a fastener, such as bolt or a screw, that may be inserted through a casing of the equipment unit 1552 into the fillable pad 1500. Likewise, the anchoring system 1558 may be the anchor 1558, generally described below, or any other suitable anchoring system, such as an independent anchoring system of the type known in the art, or a post inserted into the ground.

Such a system 1550 may be employed in association with an embodiment of the method 1600 described below. It should be noted, however, that the method 1600 may also be employed in connection with other systems and/or fillable pads.

Figure 16:
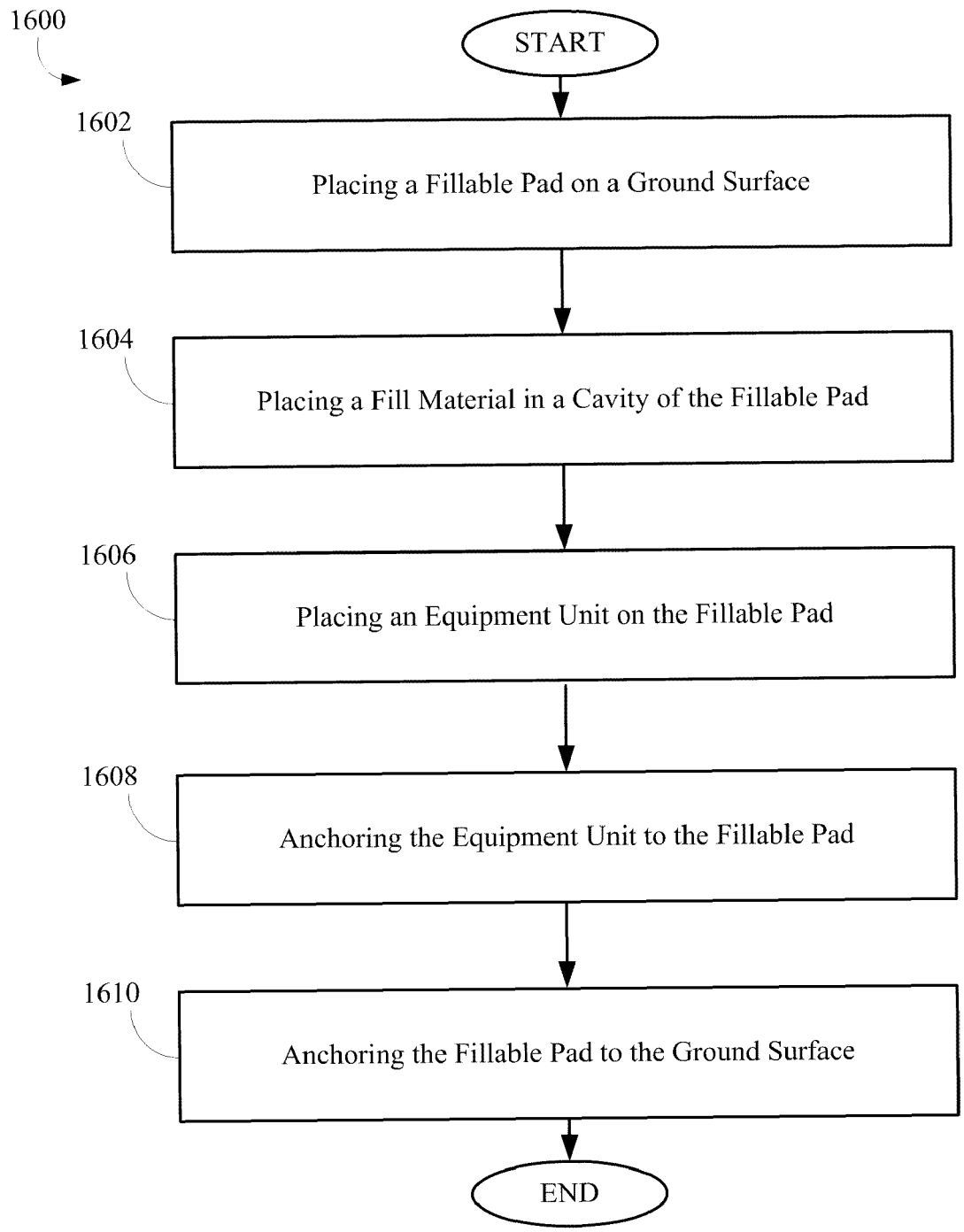
FIG. 16 is a block diagram illustrating an embodiment of a method for elevating an equipment unit.

FIG. 16 is a block diagram illustrating an embodiment of a method 1600 for elevating an equipment unit. In block 1602, a fillable pad is placed on a ground surface. The fillable pad may include a support surface adapted for supporting an equipment unit above the ground, a cavity formed in the fillable pad for receiving a fill material, and an opening formed in the support surface that provides access to the cavity for placing the fill material in the cavity. Embodiments of a fillable pad are described above with reference to FIGS. 1-15, although other fillable pads may be used herein. The fillable pad may be oriented on the ground surface such that the support surface is positioned above the ground surface, and the opening is exposed for inserting the fill material into the cavity.

In block 1604, a fill material may be placed in the cavity of the fillable pad. The fill material may have any configuration suited for anchoring the fillable pad to the ground. For example, the fill material may be concrete 1560 as shown in FIG. 15, although any other fill material may be used. The fill material may be placed into the cavity through the opening. In embodiments in which the fill material is concrete, the concrete may be poured into the cavity while in workable form, or the concrete may be mixed directly in the cavity. In embodiments, the fillable pad may have more than one cavity, in which case the fill material may be placed in one or more of the cavities.

In some embodiments, placing a fill material in the cavity in block 1604 also may include placing a sheet over the fill material in the cavity. In cases in which the fill material is cement or concrete, the sheet may retain moisture in the cement or concrete during the curing process. The sheet also may form a barrier between the fill material and the equipment unit, such that the fill material is out of contact with the equipment unit. An embodiment of a sheet 1554 is shown in FIG. 15, although other sheets may be used.

In some embodiments, placing a fill material in the cavity in block 1604 also may include placing a reinforcement in the cavity. For example, the reinforcement 1534 shown in FIG. 15 may be employed, although other reinforcements may be used. The reinforcement may be placed in the cavity before or after the fill material is placed in the cavity. For example, the reinforcement may be positioned in the cavity and workable concrete may be poured on top of the reinforcement, or workable concrete may be placed in the cavity and the reinforcement may be pressed into the workable concrete. Other configurations are possible. Further, the reinforcement is not necessary and may be omitted.

In block 1606, an equipment unit may be placed on the fillable pad. The equipment unit may be placed out of contact with the fill material in the cavity. Specifically, the equipment unit may be placed on the support surface oriented so that the weight of the equipment unit is transferred through the support to the ground. In embodiments in which the fill material is concrete, the equipment unit may be placed on the fillable pad before the concrete has cured. An embodiment of an equipment unit 1552 is shown in FIG. 15. The equipment unit may be, for example, an air conditioning condenser unit or a heat pump, although any equipment unit or other device or article may be placed on the fillable pad.

In block 1608, the equipment unit may be anchored to the fillable pad. Any anchoring system may be employed. For example, straps 1562 of the type shown in FIG. 15 may be employed. The straps may have a portion that is secured to the fillable pad and a portion that extends around the equipment unit. For example, a portion of the straps may be embedded in the fill material to secure the straps to the fillable pad. In embodiments in which the fill material is concrete, the straps may be embedded in the concrete while the concrete is in workable form, such that the straps become secured within the concrete once the concrete solidifies. Alternatively, any other anchoring system may be used. For example, a fastener such as a bolt or a screw may be inserted through a casing of the equipment unit into the fillable pad.

In block 1610, the fillable pad is anchored to the ground surface. The fillable pad may be anchored to the ground surface using an anchor 1558 of the type shown in FIG. 15. The anchor 1558 may be inserted through the cavity into the ground surface, such that the anchor 1558 extends upward into the cavity. In embodiments in which the fill material is concrete, the anchor 1558 may become embedded in the concrete once the concrete solidifies in the cavity. In embodiments in which the fillable pad includes a ground portion, the anchor may extend through an access opening of the type described with reference to FIG. 9. Alternatively, any other anchoring system may be used. For example, an independent anchoring system may be used. Also, a post may be inserted, as described above with reference to FIG. 9.

It should be noted that the order of blocks may be reversed in some embodiments of the method 1600. For example, the fillable pad may be anchored to the ground surface in block 1610 before the equipment unit is anchored to the fillable pad in block 1608. Further, one or more of the blocks may be omitted. For example, blocks 1608 and 1610 may be omitted.

It should be noted that the terms cement material, concrete material, and concrete may be used interchangeable herein to denote any cementitious-type material that cures or hardens from a workable state. Any fill material other than concrete may be placed in the cavity. For example, rocks, pebbles, or any other particulate may be placed in the cavity. In such cases, the fill material may be in workable form even when solidified. The cavity also may be left empty. Further, any equipment unit may be placed on the fillable pad, including an air conditioning condenser unit, a heat pump, or any other suitable device or article to be elevated off of the ground. Also, the fillable pad may be used to elevate a device or article off of any surface other than a ground surface.

Embodiments of the systems and methods described above may be installed relatively quickly and relatively easily. Further, the systems and methods described above may be used in a wide range of geographical areas, including some areas where concrete equipment pads are required by law.

While particular embodiments of fillable pads and associated methods have been disclosed in detail in the foregoing description and figures for purposes of example, those skilled in the art will understand that variations and modifications may be made without departing from the scope of the disclosure. All such variations and modifications are intended to be included within the scope of the present disclosure, as protected by the following claims and equivalents thereof.

The invention claimed is:

1. A method of elevating an equipment unit above a ground surface, the method comprising:

placing a pour-in-place fillable pad configured to support the equipment unit on the ground surface, the fillable pad comprising:
   a cavity for receiving workable fill material, the cavity having a base and a centrally-located top opening; and
   a support surface for the equipment pad, the support surface formed as a substantially planar circumambient terrace with respect to the cavity, the support surface having an interior boundary defining the top opening of the cavity and an exterior boundary defining an intersection between the support surface and one or more exterior walls;
   wherein the interior boundary of the support surface has a span that at least approaches, in extent, a corresponding span of a perimeter of the equipment unit; and placing a workable cementitious fill material in the cavity of the fillable pad;

placing the equipment unit on the support surface of the fillable pad; and allowing the cementitious fill material to solidify and cure.

2. The method of claim 1, wherein placing a workable cementitious fill material in a cavity comprises placing cement in the cavity of the fillable pad through the top opening.

3. The method of claim 1, wherein placing the equipment unit on the support surface of the fillable pad comprises placing the equipment unit on the fillable pad before the workable cementitious fill material has solidified.

4. The method of claim 1, further comprising placing a sheet on top of the workable fill material in the cavity between the workable cementitious fill material and the equipment unit.

5. The method of claim 1, further comprising embedding a reinforcement structure in the workable cementitious fill material in the cavity before the workable fill material has solidified.

6. The method of claim 1, further comprising anchoring the equipment unit to the fillable pad.

7. The method of claim 1, further comprising anchoring the equipment unit to the fill material.

8. The method of claim 1, further comprising anchoring the fillable pad to the ground surface.

9. The method of claim 1, wherein placing a workable cementitious fill material in the cavity comprises mixing the workable fill material directly within the cavity.

10. The method of claim 1, wherein placing a workable cementitious fill material in the cavity comprises mixing the workable cementitious fill material outside of the cavity and pouring the workable fill material into the cavity.

11. The method of claim 1, wherein placing the fillable pad on the ground surface comprises orienting the fillable pad such that the support surface is positioned above the ground surface and the opening is exposed for inserting the fill material into the cavity.

12. The method of claim 1, wherein the cavity has a bottom perimeter and angled interior walls extending from the bottom perimeter to the top opening such that the cavity has a relatively larger cross-sectional area at its top opening than its bottom perimeter.

13. The method of claim 1, wherein placing the equipment unit on the support surface of the fillable pad comprises placing the equipment unit on the support surface above the fill material in the cavity.

14. The method of claim 1, further comprising transferring a portion of the weight of the equipment unit to the ground surface via a weight transfer structure associated with the fillable pad.

15. The method of claim 1, further comprising supporting a portion of the weight of the equipment unit with a support pillar positioned in the cavity of the fillable pad.

16. The method of claim 1, wherein the fill material has a weight that is sufficient to maintain the fillable pad in contact with the ground surface.

17. The method of claim 1, wherein the fillable pad is shaped and dimensioned so that when the equipment unit is placed on the support surface of the fillable pad, the equipment unit is above the fill material in the cavity.

18. The method of claim 1, wherein the fillable pad is stackable with another similarly shaped fillable pad.

19. The method of claim 1, wherein the interior wall defines the boundary of the cavity.

20. The method of claim 12, wherein the interior walls include at least one passage therethrough for workable cementitious fill material to flow between the interior wall and exterior walls of the fillable pad.

* * * * *